United States Patent [19]

Stokes et al.

[11] Patent Number: 5,896,696
[45] Date of Patent: Apr. 27, 1999

[54] SELECTIVE RADIO FREQUENCY PEST CONTROL APPARATUS

[75] Inventors: John H. Stokes, Lincoln, Nebr.; Pat Fox, 10919 Deanne Dr., Sun City, Ariz. 85351

[73] Assignee: Pat Fox, Sun City, Ariz.

[21] Appl. No.: 08/548,328

[22] Filed: Nov. 1, 1995

[51] Int. Cl.$^6$ ......................................... A01M 3/00
[52] U.S. Cl. ............................................ 43/124; 43/132.1
[58] Field of Search .................................. 43/124, 132.1; 455/93, 66, 108, 110, 111; 250/493.1

[56] References Cited

U.S. PATENT DOCUMENTS

| | | | |
|---|---|---|---|
| 4,178,578 | 12/1979 | Hall | 367/139 |
| 4,366,644 | 1/1983 | Lawrence | 43/132 R |
| 4,982,100 | 1/1991 | Harding, Jr. | 250/504 R |
| 5,339,564 | 8/1994 | Wilson, et al. | 43/124 |

*Primary Examiner*—Joseph J. Hall, III
*Assistant Examiner*—Anthony Ojini
*Attorney, Agent, or Firm*—Richard E. Oney

[57] ABSTRACT

This application discloses an apparatus and method for generating and radiating energy at specific radio frequency wavelengths known to adversely affect the nervous systems of small insects such as flies, gnats, cockroaches, termites and the like wherein each is affected by a different frequency or range of frequencies; the apparatus containing a power supply, a voltage selector circuit for generating sequences of specific voltages, a modulator circuit to amplitude modulate each specific voltage about its center level, a multiple frequency generator to convert each modulated voltage into a modulated frequency of both fundamental and harmonic content, a radio frequency transmitter circuit, and a random interval timer circuit to energize and de-energize the radio frequency transmitter circuit in such a manner as to prevent the pest from acquiring an immunity to the radiated energy. There is further disclosed a method of forming patterns of radiated energy wherein said multiple frequency generator, said modulator circuit, said voltage selector circuit, said radio frequency transmitter circuit and said random interval timer circuit are operably connected in such a manner as to produce bursts of radio frequency energy at slightly varying fixed frequencies having both fundamental and harmonic content and wherein such bursts are continuously varied in both their interval and duration.

20 Claims, 2 Drawing Sheets

SELECTIVE RADIO FREQUENCY PEST CONTROL APPARATUS

BACKGROUND OF THE INVENTION

1. Field of the Invention

This invention relates to a device for the control and elimination of small insects such as house flies, gnats, cockroaches and the like and more particularly to a device which interferes with the central nervous system of such pests by generating and radiating bursts of radio frequency energy at specific frequencies which are known to disturb or incapacitate each insect.

2. Description of the Prior Art

As is well known in prior art, numerous methods of controlling and eliminating insects, rodents and other pests have been developed. These devices fall generally into the categories of chemical agents, mechanical traps and electronic devices. In general, the electronic devices have tended to utilize either vibratory, sonic or ultrasonic means to disturb the pest. The inventor knows of no prior art which employs radio frequency energy as a means to control and eliminate small insect pests. Experiments conducted in Italy by Dr Sordello Attiij, in the United States by Georges Lakhovsky and in Germany have conclusively proven that radio waves can be made to affect the central nervous system of living things. Mechanical and chemical devices are not addressed in this application as prior art since their methods of pest control and elimination are radically different from the present invention and suffer from severe deficiencies in terms of their complexity or potential adverse impact upon the environment. Several Prior Art electronic devices fall into the audible category of insect control apparatus wherein the frequency or frequencies generated are in the range of 0.01 hz to 120 hz. Typically, these devices are designed to radiate a frequency into the ground to cause a disturbing effect on burrowing rodents such as mice or gophers. One such device is disclosed in U.S. Pat. No. 4,215,429 by Riach whereby vibrations are imparted at irregular intervals into the earth. Such a device is ineffective against insects as the energy emitted must be impinged upon the pest in order for it to be affected. A second type of device employs higher frequencies often in the ultrasonic range of 10 khz to 50 khz to repel everything from rats to mosquitoes. One such device disclosed by White in U.S. Pat. No. 3,891,962 makes use of an ultrasonic transducer which generates multiple frequency outputs with both fundamental and harmonic components. The signals generated by this device are impinged upon the tympanic membrane of the insect with the object being to cause the insect to leave the immediate area. Numerous other Prior Art devices such as U.S. Pat. Nos. 3,872,472 by Moschgat, 4,178,578 by Hall and 3,328,908 by Moe disclose similar methods for pest control employing radiated ultrasonic energy to affect essentially the hearing of the pest.

SUMMARY OF THE INVENTION

The present invention differs from each of the Prior Art inventions in several important aspects. First and foremost, the present invention is designed to affect the central nervous system of the pest or insect by upsetting the delicate balance of electrical signals which control its actions. The present invention also takes into account the adaptability of the pest wherein its susceptibility to a specific frequency might eventually diminish. Unlike Prior Art devices which employ intermittent bursts of energy to prevent adaptation, the present invention slightly modulates the specific frequency known to affect each pest while simultaneously randomly varying both the duration and interval of the radio frequency signal. The present invention is made to generate specific frequencies which have been shown to adversely affect specific insects while Prior Art devices typically employ a frequency sweeping technique in the hope of covering the frequency actually necessary to disturb the pest. Finally, the present invention requires no harsh chemicals which might adversely effect the environment, produces no signals which are audible to either humans or pets and requires no mechanical devices or traps, each of which which might be injurious to small children, pets, or beneficial fauna such as birds, earthworms, butterflies or the like. The present invention thus overcomes the disadvantages of the Prior Art by employing radio frequency energy which is generated at specific frequencies known to affect each specific pest as a means of controlling and eliminating those pests by adversely affecting the central nervous system.

One embodiment of the invention consists of a device for controlling and eliminating pests and insects using radio frequency and comprising in combination a source of electrical power, a multiple frequency generator circuit means, a frequency modulator circuit means, a frequency selector circuit means, a radio frequency transmitter circuit means, a random interval timer means and a carrier current transmitter circuit means wherein each are operably connected to the source of electrical power and to one another such that the multiple frequency generator means produces electrical signals in the form of square waves with the fundamental frequency of the square wave being controlled by the frequency selector circuit means and modulated by the frequency modulator means and wherein the radio frequency transmitter circuit means and the carrier current transmitter circuit means are each modulated by the resultant complex waveform and further energized and de-energized on a random and periodic basis by the random interval timer means.

It is thus a primary object of the invention described herein to provide an electronic device which employs radio frequency signals to act upon the central nervous system and control and eliminate insect pests.

Another object of the invention is to generate specific radio frequencies in order to affect specific types of pests.

Another object of the invention is to generate specific radio frequencies which have both fundamental and harmonic content.

Another object of the invention is to generate specific frequencies which are modulated about a center fundamental frequency in order to keep the pest from adapting to the specific frequency.

Another object of the invention is to provide a means to adapt the apparatus for use on different types of insects or pests by simply changing the specific frequency or frequencies generated.

Another object of the invention is to randomly vary the period and duration of the frequency or frequencies generated on a random and periodic basis.

Another object of the invention is to provide a means to generate a plurality of specific frequencies one after another on a repetitive yet random basis such that the sequence is constantly changing.

A still further object of the invention is to provide an insect and pest control device which employs radio frequency energy of specific frequencies directed at specific insects which overcomes the limitations and deficiencies of mechanical, chemical, vibratory, ultrasonic and audible pest control devices.

Yet another object of the invention is to provide a device of the character herewithin described which has an external omnidirectional antenna for radiating the radio frequency signal and which utilizes the normal AC wiring of the building within which it is located as a secondary antenna. Other and further objects of the invention will become apparent upon review of the ensuing detailed description and drawings.

BRIEF DESCRIPTION OF THE DRAWING FIGURES

DETAILED DESCRIPTION OF THE PREFERRED EMBODIMENT

Figure 1:
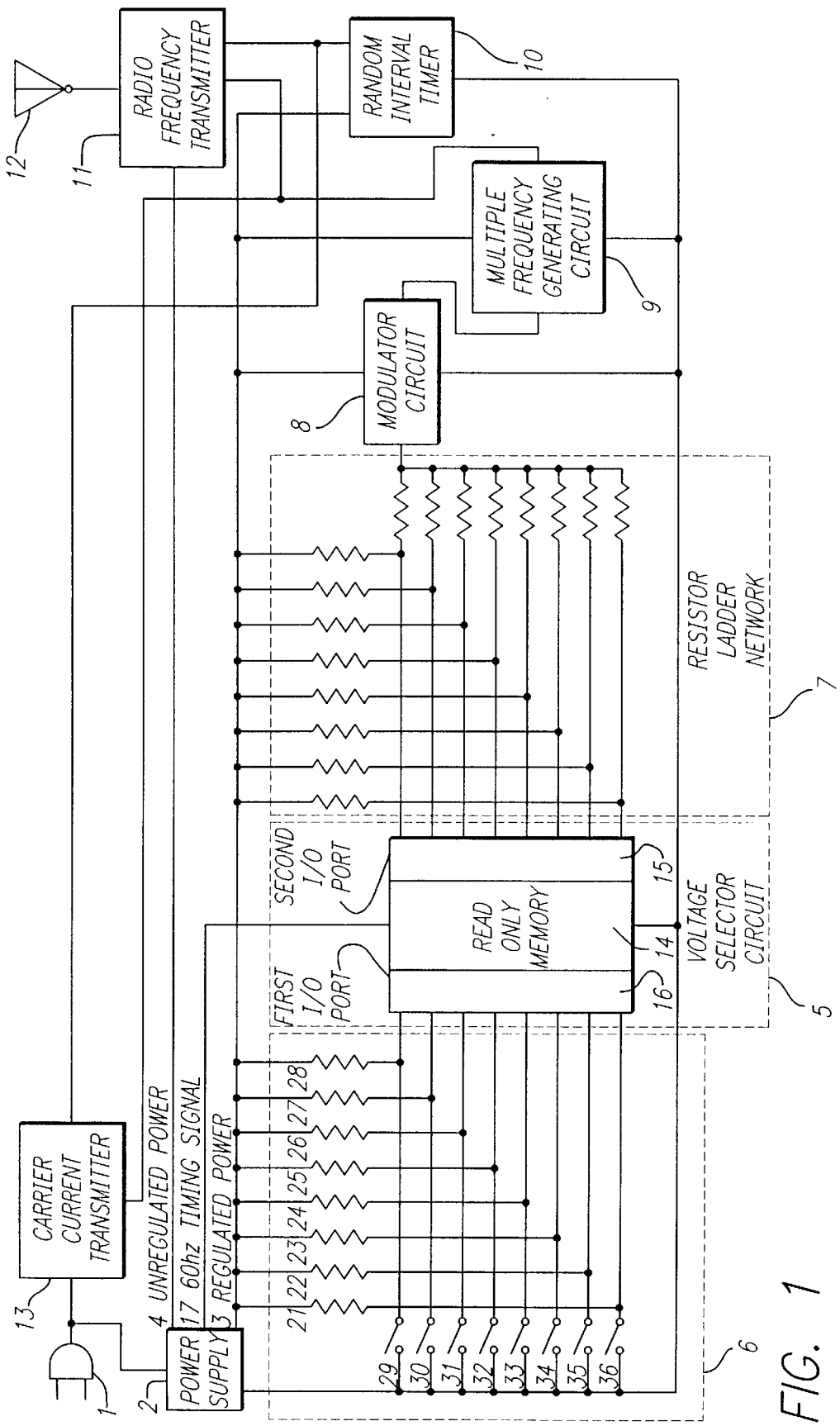
FIG. 1 is a block diagram of the preferred embodiment.
Figure 2:
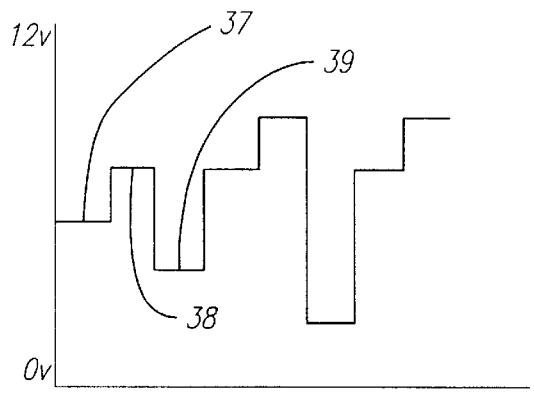
FIG. 2 is an example of a sequence of specific voltages.

Referring now to the drawings and more particularly to FIG. 1, according to the present invention there is shown a selective radio frequency pest control apparatus. A source of standard 117 volt AC power 1 is operably connected to power supply means 2 which generates both a regulated power means 3 and an unregulated power means 4 as sources of DC power for other circuit elements of the invention. Additionally, a 60 hz timing signal means 17 emanates from power supply means 2 and is operably connected to a voltage selector circuit means 5 for use as a timing reference. In the preferred embodiment, regulated power means 3 is made to be 12 volts DC and unregulated power means 4 is made to be about 18 volts DC. Voltage selector circuit means 5 is comprised of a read only memory means 14 which is programmed with sequences of frequencies, intervals and durations during the manufacturing process, a first I/O port means 16, and a second I/O port means 15. External binary switching matrix means 6 is comprised of pullup resistors 21 through 28 and selector switches 29 through 36 and is operably connected to first I/O port means 16 of voltage selector circuit means 5. Voltage selector circuit means 5 is made to select a specific voltage or sequence of voltages by the combination of the settings of selector switches 29 through 36 which in combination can select between 256 different combinations of voltages, intervals and durations stored in read only memory means 14 at the time of manufacture. The output from voltage selector circuit means 5 is a plurality of voltages which are formed by the combination of ones and zeros output from second I/O port means 15 through R/2R resistor ladder network means 7. Modulator circuit means 8 amplitude modulates each voltage which is produced by voltage selector circuit means 5. A Multiple frequency generating circuit means 9 of the voltage to frequency converter type employs each amplitude modulated varying input voltage to cause it to produce an output waveform of the square wave variety which varies in frequency in direct proportion to the amplitude modulated input voltage. Multiple frequency generating circuit means 9 generates a sequence of frequencies directly corresponding to specific output voltages produced by voltage selector circuit means 5, second I/O port means 15, and R/2R resistor ladder network means 7. The level and duration of each voltage produced by voltage selector circuit means 5 is determined by two factors. The first is a preset pattern programmed into the read only memory means 14 of voltage selector circuit means 5 at the time of manufacture. The second factor is the setting of switches 29 through 36 which together with pullup resistors 21 through 28 form an 8 bit binary value. This value is read by voltage selector circuit means 5 through first I/O port means 16 causing voltage selector circuit means 5 to select between 255 separate and distinct patterns of voltages and durations thus providing a method to adapt the apparatus for use on different types of pests. In the preferred embodiment, voltage selector circuit means 5 can thus produce 255 distinct sequences of output voltages with each having differing durations and intervals. To generate a specific voltage, voltage selector circuit means 5 outputs a binary value through second I/O port means 15. The combination of ones and zeros output from second I/O port means 15 act to pull up or pull down the voltages present upon R/2R resistor ladder network means 7. The resultant circuit actually forms an inexpensive digital to analog converter which generates the voltage input to modulator circuit means 8. Modulator circuit means 8 is of the non linear amplifier variety which amplitude modulates the voltage present at its input by a fixed percentage regardless of the voltage level. In the preferred embodiment, a voltage level of 1 volt for example would be amplitude modulated by + −0.05 volts whereas a voltage of 10 volts would be amplitude modulated by + −0.5 volts which is ten times as great.

Modulator circuit means 8 is operably connected to multiple frequency generating circuit means 9 in such a fashion as to cause the input voltage to multiple frequency generating circuit means 9 to vary about the center of the voltage output from R/2R resistor ladder network means 7 by an amount which in the preferred embodiment is + −5% of each voltage as it is produced.

Figure 4:
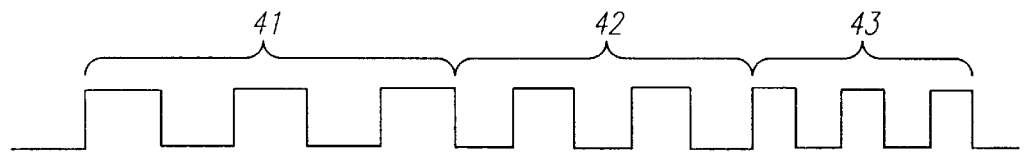
FIG. 4 is a time expanded diagram of a single specific modulated frequency which has been modulated about its center

The output from modulator circuit means 8 causes the voltage input to multiple frequency generating circuit means 9 to vary by + −5% which causes a corresponding + −5% fluctuation in each specific frequency which is produced. Voltage selector circuit means 5 changes the voltages it generates based upon the receipt of a specified number of pulses from 60 hz timing signal means 17. External omnidirectional antenna means 12 is operably connected to the amplified radio frequency output of radio frequency transmitter means 11 and radiates the signal into the immediate area. Carrier current transmitter circuit means 13 is coupled to AC power source 1 such that the composite waveform 41,42 and 43 as depicted in FIG. 4 is injected on to the AC wiring of the structure within which the apparatus is located. This waveform is also energized and de-energized by random interval timer means 10 at a random rate of about 1 hz.

Figure 3:
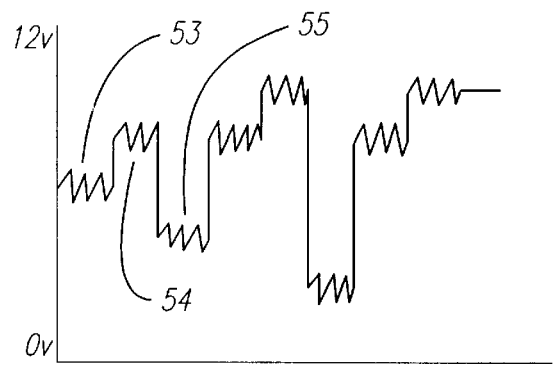
FIG. 3 is a depiction of the same sequence of specific voltages having been modulated about the center of each specific voltage.
Figure 5:
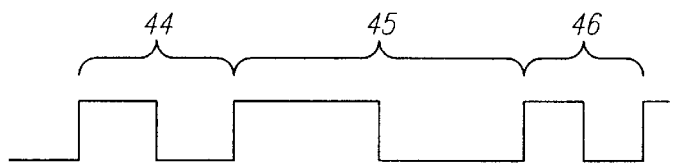
FIG. 5 is a sequence of random timing pulses of about one pulse per second.
Figure 6:
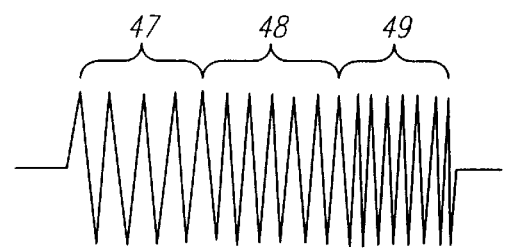
FIG. 6 is a time expanded view of the radio frequency waveform of a single frequency which has been modulated about its center.
Figure 7:
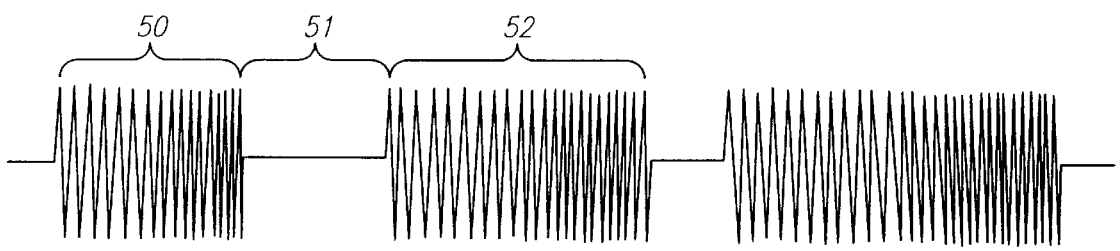
FIG. 7 is a time compressed view of a sequence of specific radio frequencies which have been modulated about their center and which have been energized and de-energized randomly at about one burst per second.

Referring now additionally to FIGS. 2, 3, 4, and 5 there are shown the output waveforms from R/2R resistor ladder network means 7, frequency modulator circuit means 8, multiple frequency generating circuit means 9 and random interval timer circuit means 10 respectively. A plurality of voltages 37,38 and 39 are generated sequentially with each voltage having a random length. Each voltage 37,38 and 39 is sequentially input to modulator circuit means 8 where it is modulated by + −5% in the preferred embodiment. The resultant plurality of output modulated voltages 53,54 and 55 are depicted in FIG. 3. Each output modulated voltage 53,54 and 55 is applied in succession to the input of multiple frequency generating circuit means 9. Refering now to FIG. 4 there is shown an output center frequency 42, a lower frequency 41 and an upper frequency 43 which is typical of the output waveform generated by multiple frequency generating circuit means 9 produced from a single output modulated voltage 38. Lower frequency 42 and upper frequency 43 are each respectively 5% below or above output center frequency 42 in the prefered embodiment. The output waveform from multiple frequency generating circuit means 9 as depicted in FIG. 4 is applied to the input of radio frequency transmitter circuit means 11 as well as the input to carrier current transmitter circuit means 13. The waveform depicted in FIG. 4 is thus a composite of the fundamental and harmonic frequencies generated by multiple frequency generating circuit means 9 which have been further modulated by modulator circuit means 8 yielding a composite waveform having a center frequency 42, a lower frequency 12 and an upper frequency 43. Voltage selector circuit means 5 is made to change to each successive voltage by 60 hz timing signal means 17 which emanates from power supply means 2. Random interval timer means 10 produces a plurality of sucessive timing signals 44,45 and 46 as depicted in FIG. 5 which are randomized about the rate of 1 hz. For example, a first random period 44 would have a duration of about 1 second, a second random period 45 would have a duration of about 2 seconds and a third random period 46 would have a duration of about 0.75 seconds in the preferred embodiment. Each random period 44, 45 and 46 is comprised of equal on and off phases which causes radio frequency transmitter circuit means 11 and carrier current transmitter circuit means 13 to alternately be energized and de-energized at a random rate varying between 0.75 seconds and 2 seconds in the preferred embodiment. Refering finally to FIG. 7 there is shown a plurality of composite waveforms 50 and 52, and a de-energized interval 51 present at the antenna 12 of the present invention. Together, composite waveform 50, de-energized interval 51 and second composite waveform 52 depict a plurality of specific frequencies of random lengths which have been modulated by + −5% and which have been further energized and de-energized randomly about a period of about one second.

From the foregoing, it can be seen that the present invention is well adapted to meet the objectives set forth herein together with other advantages and objectives which are obvious and which are inherent to the design.

It is to be understood that certain features and combinations of features are of utility and may be employed without reference to other features and combinations. This is contemplated by and is within the scope of the claims.

Since many possible embodiments may be made from the present invention without departing from the scope thereof, it is to be understood that all matter set forth herein or shown in the accompanying drawings is to be interpreted as illustrative in nature and not in a limiting sense.

Having thus described the invention, what is claimed is:

1. A pest control apparatus for generating radio frequency energy at selected frequencies that control pests, the apparatus comprising:

voltage selector means for providing a stepped signal having a level selected from a plurality of predetermined levels on a periodic basis, the voltage selector means comprising memory means for storing information for selecting the stepped signal level sequence and duration;

modulator means for amplitude modulating each level of the stepped signal;

frequency generating means for converting the amplitude modulated level of the stepped signal into a frequency modulated signal having fundamental and harmonic frequency content corresponding to the level of the stepped signal;

radio frequency transmitter means for transmitting radio frequency energy in response to the frequency modulated signal; and timer means for sequentially energizing and de-energizing the radio frequency transmitter means on a periodic basis.

2. The pest control apparatus of claim 1 wherein the voltage selector means comprises a binary switching means for selecting the stepped signal level sequence and duration.

3. The pest control apparatus of claim 1 wherein the voltage selector means comprises microprocessor means for selecting the stepped signal level sequence and duration.

4. The pest control apparatus of claim 1 wherein the voltage selector means further comprises digital-to-analog converter means for providing the stepped signal level in response to a digital output of the information from the memory, means.

5. The pest control apparatus of claim 1 wherein each of the fundamental and harmonic components of the frequency modulated signal is modulated by about plus and minus five percent.

6. The pest control apparatus of claim 1 wherein the radio frequency transmitter means comprises an omnidirectional antenna.

7. The pest control apparatus of claim 1 wherein the digital-to-analog converter means comprises an R/2R resistor ladder network.

8. The pest control apparatus of claim 1 wherein the timer means sequentially energizes and de-energizes the transmitter means randomly at a random rate varying between 0.75 seconds and two seconds.

9. A pest control apparatus for generating radio frequency energy at selected frequencies that control pests, the apparatus comprising:

voltage selector means for providing a stepped signal having a level selected from a plurality of predetermined levels on a periodic basis, the voltage selector means comprising memory means for storing information for selecting the stepped signal level sequence and duration;

modulator means for modulating each level of the stepped signal about the level;

frequency generating means for converting the amplitude modulated level of the stepped signal into a frequency modulated signal having fundamental and harmonic frequency content corresponding to the level of the stepped signal;

current carrier means for generating a radio frequency carrier signal in a conductor for providing power to the pest control apparatus, the carrier signal being generated in response to the frequency modulated signal; and timer means for sequentially energizing the carrier current means on a periodic basis.

10. The pest control apparatus of claim 9 wherein the voltage selector means comprises a binary switching means for selecting the stepped signal level sequence and duration.

11. The pest control apparatus of claim 9 wherein the voltage selector means comprises microprocessor means for selecting the stepped signal level sequence and duration.

12. The pest control apparatus of claim 9 wherein the voltage selector means further comprises digital-to-analog converter means for providing the stepped signal level in response to a digital output of the information from the memory means.

13. The pest control apparatus of claim 9 wherein each of the fundamental and harmonic components of the frequency modulated signal is modulated by about plus and minus five percent.

14. The pest control apparatus of claim 9 wherein the digital-to-analog converter means comprises an R/2R resistor ladder network.

15. The pest control apparatus of claim 9 wherein the timer means sequentially energizes and de-energizes the transmitter means a random rate varying between 0.75 seconds and two seconds.

16. A method for controlling pests comprising the steps of:

providing a stepped signal having a level selected from a plurality of predetermined levels on a periodic basis;

storing information in memory means for selecting the stepped signal level sequence and duration;

amplitude modulating each level of the stepped signal;

converting the amplitude modulated level of the stepped signal into a frequency modulated signal having fundamental and harmonic frequency content corresponding to the level of the stepped signal;

transmitting radio frequency energy in response to the frequency modulated signal; and sequentially energizing and de-energizing the radio frequency transmitter means on a periodic basis.

17. The pest control method of claim 16 further comprising the step of providing binary switching means for selecting the stepped signal level sequence and duration.

18. The pest control method of claim 16 further comprising the step of providing microprocessor means for selecting the stepped signal level sequence and duration.

19. The pest control method of claim 16 wherein each of the fundamental and harmonic components of the frequency modulated signal is modulated by about plus and minus five percent.

20. The pest control method of claim 16 wherein the timer means sequentially energizes and de-energizes the transmitter means randomly at a random rate varying between 0.75 seconds and two seconds.

* * * * *